(12) United States Patent
Morrison et al.

(10) Patent No.: US 6,767,049 B1
(45) Date of Patent: Jul. 27, 2004

(54) DOOR MODULE WATER SHIELD

(75) Inventors: Gerald O. Morrison, Madison Heights, MI (US); Carter Cannon, Edersberg (DE); Iris C. Drew, Berkley, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/248,995

(22) Filed: Mar. 7, 2003

(51) Int. Cl.$^7$ ................................................. B60J 5/00
(52) U.S. Cl. .................................. 296/146.7; 296/1.08
(58) Field of Search .......................... 296/146.7, 146.1, 296/1.08, 39.1; 49/502

(56) References Cited

U.S. PATENT DOCUMENTS

| | | | |
|---|---|---|---|
| 4,588,627 A | | 5/1986 | Isaksen et al. ................. 428/80 |
| 4,972,765 A | * | 11/1990 | Dixon .......................... 454/164 |
| 5,456,513 A | * | 10/1995 | Schmidt ....................... 296/39.1 |
| 5,482,343 A | | 1/1996 | Bradac ......................... 296/39.1 |
| 5,584,144 A | | 12/1996 | Hisano ........................... 49/502 |
| 5,688,015 A | | 11/1997 | Patterson et al. ............. 296/39.1 |
| 5,904,002 A | | 5/1999 | Emerling et al. ................ 49/502 |
| 6,076,882 A | | 6/2000 | Szerdahelyi et al. .......... 296/146.1 |
| 6,197,403 B1 | | 3/2001 | Brown et al. ................. 428/137 |
| 6,412,852 B1 | | 7/2002 | Koa et al. .................... 296/146.7 |
| 6,422,640 B2 | * | 7/2002 | Whitehead et al. ......... 296/146.7 |
| 2003/0068458 A1 | * | 4/2003 | Pattok et al. ................. 428/40.1 |
| 2003/0116993 A1 | * | 6/2003 | Skarb et al. ................ 296/146.7 |

FOREIGN PATENT DOCUMENTS

JP 359034923 * 2/1984 ............... 296/146.7

* cited by examiner

Primary Examiner—D. Glenn Dayoan
Assistant Examiner—H. Gutman
(74) Attorney, Agent, or Firm—Bill C. Panagos

(57) ABSTRACT

A door module has a water barrier for positioning between the interior surface of a vehicle door exterior panel and the door interior trim panel comprising a sheet of semi-rigid water impervious material having an inner face and an outer face. A permanent pressure sensitive adhesive bead is applied around the periphery of the inner face of the water barrier and is further defined as located inwardly of any openings for mounting the vehicle door exterior panel and the door interior trim panel together. The water barrier further comprises an access opening having a permanent welded hinged opening cover the opening cover having a permanently tacky re-sealable adhesive bead located around the periphery of the non-welded edges.

13 Claims, 4 Drawing Sheets

DOOR MODULE WATER SHIELD

BACKGROUND OF INVENTION

1. Field of the Invention

The present invention generally relates to the formation of a modular trim panel and water shield. More particularly the present invention relates to the formation of a modular trim panel having a water shield which provides a re-sealable access port for the assembly and connection of various door components thorough the water shield and trim panel.

2. Description of the Related Art

A door for an automotive vehicle typically comprises an exterior panel which is formed of an outer, generally curved, exterior sheet of metal or plastic. The exterior panel conforms to the exterior surface of the body of the vehicle. An inner surface is formed on the panel by a metal sheet whose edges are peripherally secured to the outer sheet. The inner sheet, typically, is formed with a large central opening for access to a cavity provided between the sheets within the exterior door panel. A slot is formed at the upper edges of the two sheets for receiving a sheet of glass. The glass sheet may be lowered into the cavity between the sheets for opening the window, or it may be raised upwardly for closing the window. Alternatively, the glass by be immovably fixed in the window opening with only its lower portion extending downwardly towards the cavity.

Usually, various door components are positioned within the cavity. These components may include a window regulator mechanism for manually raising and lowering the window or, a powered mechanism for raising and lowering the window by an electrical motor and drive system, and locking mechanisms for the door, door handle components, side view mirror attachment and adjustment components, etc.

After the exterior door panel is assembled with its various internal components, it is common to cover its interior surface that is, the inner sheet exposed inner surface, with a trim panel. The trim panel usually is made of plastic sheet material that is of a size and shape to overlap and cover the interior surface of the exterior door panel. The trim panel may be formed of a thermoplastic material or a cloth type of material or a combination of both materials. Typically, the trim panel is molded or otherwise formed with a contoured or irregular surface that includes depressions, bosses, curved areas and other such surface irregularities. Such irregularities are commonly used for design or appearance purposes for receiving and accommodating door components. For example, door components such as interior lock controls, controls for operating a motor powered raising and lowering mechanism for the window, radio speakers and arm rests. Usually the peripheral edge of the trim panel is secured to the interior surface of the door panel by mechanical fasteners that can be disengaged so that the trim panel may be manually removed for providing access to the door components located with the cavity of the exterior door panel or located within the depressions or spaces formed in the trim panel.

When the door panel includes a moveable window which may be raised up or lowered, sealing strips or gaskets are typically used to seal against the window and prevent water, that is rain water, wash water, or melted snow, or ice from entering the slot within which the window is arranged. Such water would otherwise flow into the cavities or spaces in the exterior door panel or the trim panel. However, such seals or gaskets sometimes leak because of surface wear or irregularities caused by movements of the window glass or by weathering due to changes in temperature and in sunlight. To enable that water to escape from the door, it is common to provide drain holes at the lower edge of the exterior panel. However, it is also necessary to protect the trim panel, and the devices mounted on the trim panel, from water which enters into the door. Hence, it is common to provide a water barrier between the interior surface of the door panel and the trim panel outer surface which is adjacent to the door panel interior surface. The water barrier or water shield commonly is formed of a relatively thin flexible, water impervious plastic sheet which is cut to the size and shape necessary for covering the respective surfaces. Usually the sheet is adhered to one or both of the adjacent door panels or trim panels surfaces. Typically, pressure sensitive adhesive is applied upon the peripheral edge portions of the water shield sheet so that the sheet may be pressed against and, therefore, adhered to the interior surface of the door panel before the trim panel is applied over it and secured to the door panel.

U.S. Pat. No. 6,412,852 issued Jul. 2, 2002 to Koa et al. teaches a water shield that is part of a preassembled module comprising a water barrier, sound attenuating barrier and trim panel for mounting on the inner panel of a vehicle door. The water barrier film has a provision for opening a top portion for connecting door components during assembly and for repair.

U.S. Pat. No. 6,197,403 issued Mar. 6, 2001 to Brown et al. teaches a water barrier film to which is permanently bonded a compressible sound deadening foam having a pre-shaped surface for accepting door components. The barrier film being a compressible sound deadening foam created and bonded using injection molds specific to each door configuration.

U.S. Pat. No. 6,076,882 issued Jun. 20, 2000 to Szerdahelyi et al teaches a rigid water impervious molded inner panel insert having the door components such as electric motors mounted on the dry side of the inner panel which is mounted to the inner panel of the door. A trim panel is then attached over the door inner panel and molded inner panel insert.

U.S. Pat. No. 5,904,002 issued May 18, 1999 to Emerling et al teaches a water barrier sheet that is installed with an adhesive bead around the water barrier sheet periphery after all the door components have been installed and connected.

U.S. Pat. No. 5,688,015 issued Nov. 18, 1997 to Patterson et al. teaches a water seal liner for a vehicle door formed with a plurality of pockets which are slit to provide access through the water seal liner for components needed to operate the door mechanisms. The pockets providing an awning-like surface over the openings to help prevent water migration through the water seal liner.

U.S. Pat. No. 5,584,144 issued Dec. 17, 1996 to Hisano teaches an inner door panel molded of rigid water impermeable material and having mounting recesses for mounting equipment to operate the door components such as windows, door locks, audio speakers and wiring harnesses. The door trim panel is then mounted over the inner door panel which has been mounted to the inner door.

U.S. Pat. No. 5,482,343 issued Jan. 9, 1996 to Bradac teaches a flat plastic film water barrier having awning-like coverings over attachment holes where attachment means pass through for allowing the door and trim panel to be mounted together.

U.S. Pat. No. 4,588,627 issued May 13, 1986 to Isaksen et al teaches a flat plastic film water barrier using a permanently tacky adhesive material to mount the water barrier film onto an inner door panel.

DISCLOSURE OF THE INVENTION

The present invention provides advantages and alternatives over the prior art by providing a permanent adhesive seal between the water barrier and the trim panel while maintaining a re-sealable access opening for connecting door components through the water barrier. In addition, the water barrier and trim panel can be pre-fabricated as a module for mounting as a unit on a door panel.

The present invention in one preferred embodiment thus advantageously provides a water barrier and trim panel module for mounting on a vehicle door comprising: forming a water barrier of a sheet of water impervious material, with the sheet having an inner and outer face, to a size and shape, and having openings for connecting door components there through, to fit onto the door mating face of a trim panel, an access opening, and an access opening cover having a welded hinge along one edge for assembling the door components through the water barrier and the trim panel; providing a pressure sensitive permanent adhesive bead around the periphery of the water barrier inward of openings corresponding to mechanical fastener attachment means locations on the inner face of the water barrier, providing a pressure sensitive permanent adhesive bead around the periphery of the openings for passage of door components and door component connecting means through the water barrier and trim panel; providing a permanently tacky pressure sensitive adhesive bead around the non-welded hinge edges of the access opening cover for the sealing and unsealing of said access opening cover for assembly and repair of the door components and component connecting means; and pressing the water barrier against the exterior surface of the trim panel to engage the adhesive material on the water barrier periphery forming a water barrier and trim panel module for mounting on a door panel.

Another preferred embodiment thus advantageously provides a water barrier and trim panel module for mounting on a vehicle door comprising: forming a water barrier of a sheet of water impervious material, with the sheet having an inner and outer face, to a size and shape, and having openings for connecting door components there through, to fit onto the door mating face of a trim panel, and access opening, and an access opening cover having a welded hinge along one edge fro assembling the door components through the water barrier and the trim panel; providing a pressure sensitive permanent adhesive bead around the periphery of the openings for passage of door components and door component connecting means through the water barrier and trim panel; providing a permanently tacky pressure sensitive adhesive bead around the non-welded hinge edges of the access opening cover for the sealing and unsealing of said access opening cover for assembly and repair of the door components and component connecting means; providing a pressure sensitive permanent adhesive bead within a channel around the periphery of the exterior surface of the trim panel inward of openings corresponding to mechanical fastener attachment means locations; and pressing the water barrier against the exterior surface of the trim panel to engage the adhesive material on the exterior surface of the trim panel forming a water barrier and trim panel module for mounting on a door panel.

DETAILED DESCRIPTION

Figure 1:
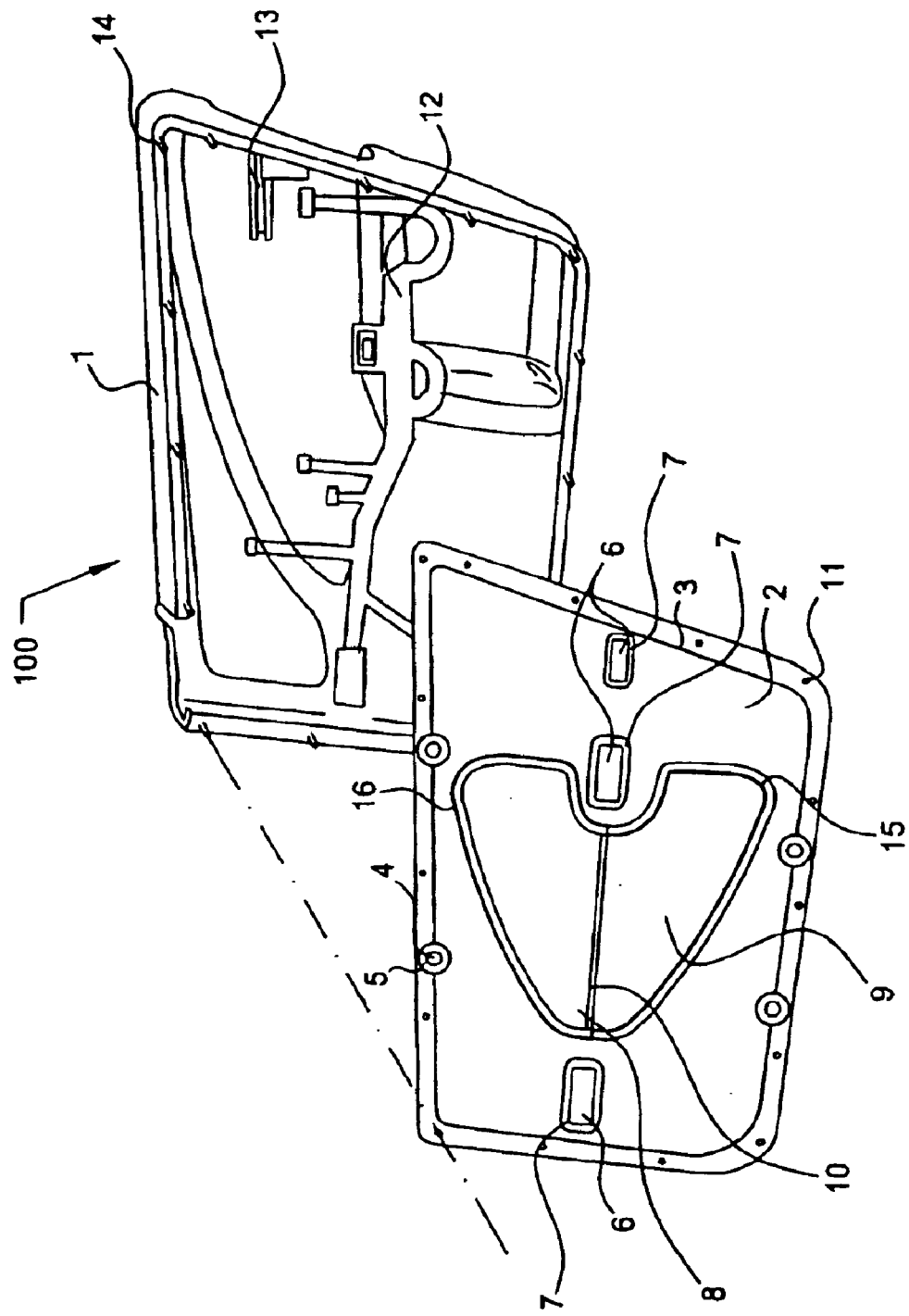
FIG. 1 shows an exploded perspective view of the water barrier door module of the present invention as seen from the door panel side.

Reference will now be made to the drawings, wherein to the extent possible like reference numerals are utilized to designate like components throughout the various views. Referring to FIG. 1, there is presented a door module 100 comprising a trim panel 1 and a water barrier 2 of the present invention. The trim panel 1 having provision for mounting a wiring harness or harnesses 12, a door latching mechanism 13, and a plurality of attaching means 14 for attaching the door module 100 to the door panel (not shown). The water barrier 2 also has openings 4 and 6 to allow necessary connecting apparatus to pass through the water barrier. The openings 4 having a bead of adhesive 5 surrounding said openings 4 to prevent water migration across the water barrier 2. Likewise, openings 6 having a bead of adhesive 7 surrounding said openings 6 t prevent water migration across the water barrier 2. Water barrier 2 further comprising an opening 8 allowing access for connecting door components and assembling the door module and the complete door assembly, and for later repair of said door, having a corresponding opening cover 9 for sealing said opening 8 after door assembly or after door repair. Located around the periphery of said opening cover 9 is a permanently tacky re-sealable adhesive bead 15. Alternatively, a permanently tacky re-sealable adhesive bead 16 may be located around the periphery of said opening 8. While it is generally understood that there is only one bead of permanently tacky re-sealable adhesive, beads on both opeing cover 9 and opening 8 may also be utilized. Also shown is weld hinge seam 10 permanently sealing opening cover 9 to water barrier 2 and allowing for easy opening of opening cover 9 along said hinge seam 10.

Figure 2:
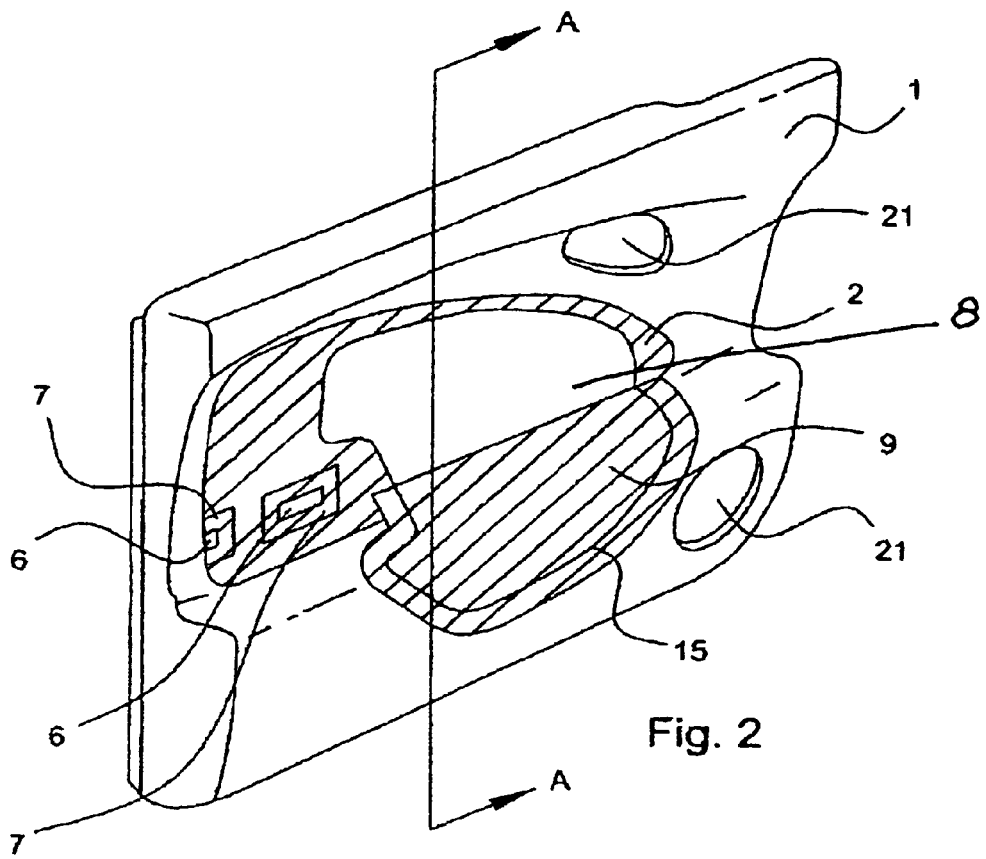
FIG. 2 shows a perspective view having a partial cut out of the water barrier door module of the present invention as seen from the trim panel side.

Turning now to FIG. 2 there is presented the exterior surface of trim panel 1 viewed in perspective with a partial section of trim panel 1 showing a door component mounting openings 21. Through the partial section of trim panel 1 is shown the water barrier 2 mounted on the interior surface of trim panel 1 further showing component openings 6 with sealing adhesive beads 7 around the periphery thereof and opening 8 and opening cover 9 in an open condition with permanently tacky re-sealable bead 15 around the periphery of said opening cover 9.

Figure 3:
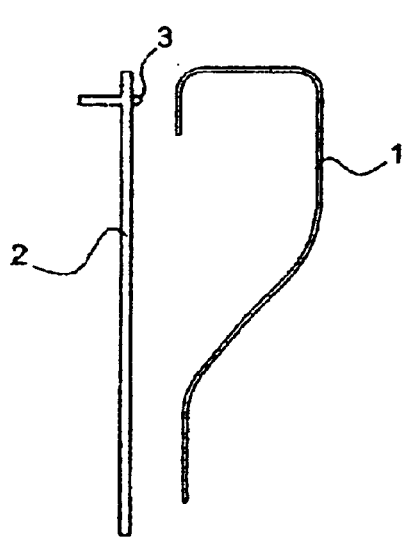
FIG. 3 shows a plan view through section line A A of the upper portion of the water barrier door module as shown in FIG. 2.

FIG. 3 shows a partial exploded end view through section line A A of FIG. 2 of the upper portion of trim panel 1 showing the orientation of the upper portion of trim panel 1 and the upper portion of water barrier 2 with associated permanent adhesive bead 3.

Figure 4:
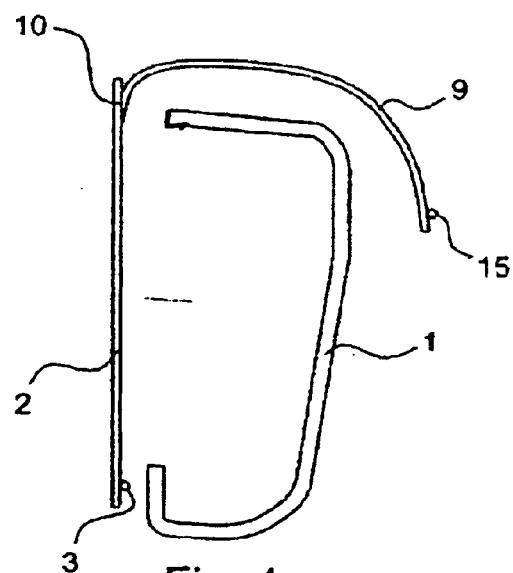
FIG. 4 shows a plan view through section line A A of the access panel portion of the water barrier door module as shown in FIG. 2.

Similarly FIG. 4 shows a partial exploded end view through section line A A of FIG. 2 of the lower portion of the trim panel 1 showing the orientation of the lower portion of trim panel 1, the lower portion of water barrier 2 with associated permanent adhesive bead 3 and opening cover 9 in an open position showing the location of associated permanently tacky re-sealable adhesive bead 15 and weld hinge seam 10.

Figure 5:
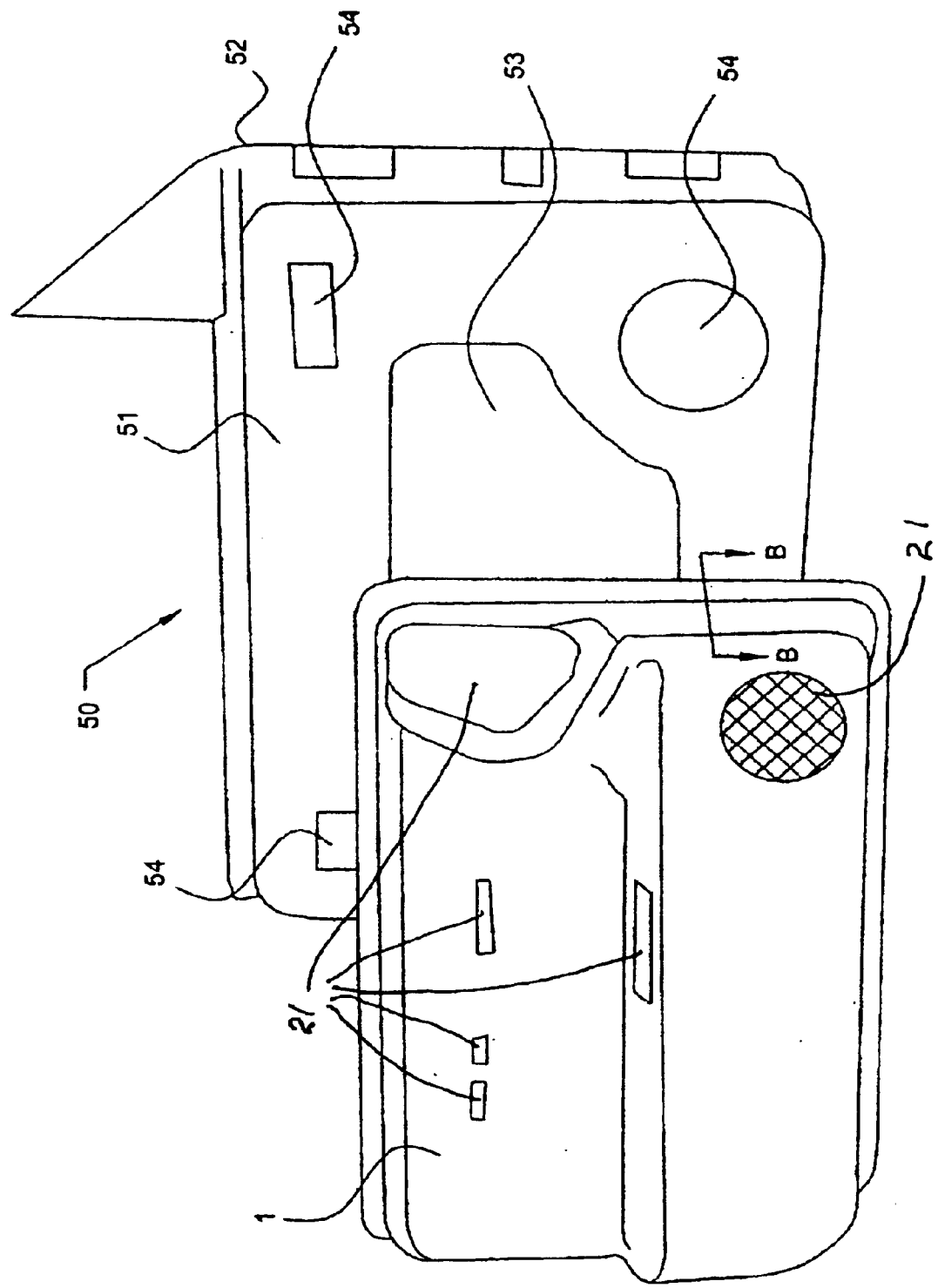
FIG. 5 shows an exploded perspective view of the assembled water barrier door module of the present invention ready for mounting on a vehicle door inner panel.

Presented in FIG. 5 is an exploded view of a door 50 having an interior door panel 51 and an exterior door panel 52. Said interior door panel 51 having component mounting openings 54 and component access and mounting opening 53 therein. Also shown is trim panel 1 having component openings 21 in orientation for final mounting on door 50.

Figure 6:
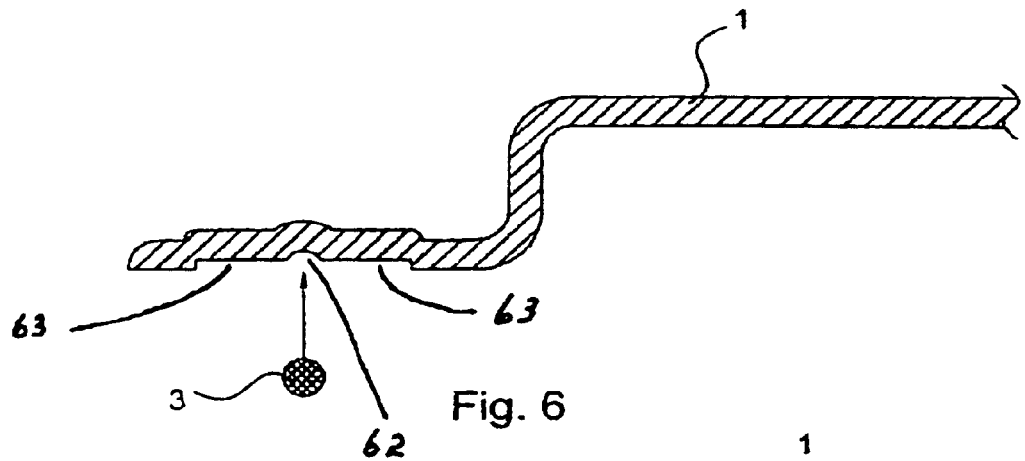
FIG. 6 shows a partial plan view of the trim panel and the permanently tacky adhesive bead ready for attachment to the trim panel periphery.
Figure 7:
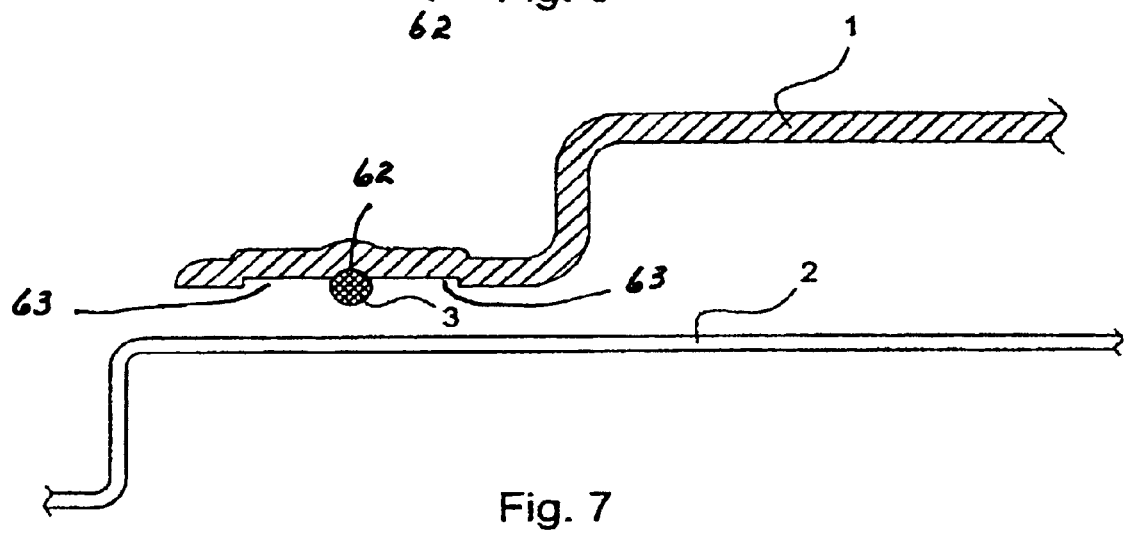
FIG. 7 shows a plan view through section line B B of FIG. 5 showing the mounted permanently tacky adhesive bead mounted on the trim panel and ready for mounting the water barrier film.
Figure 8:
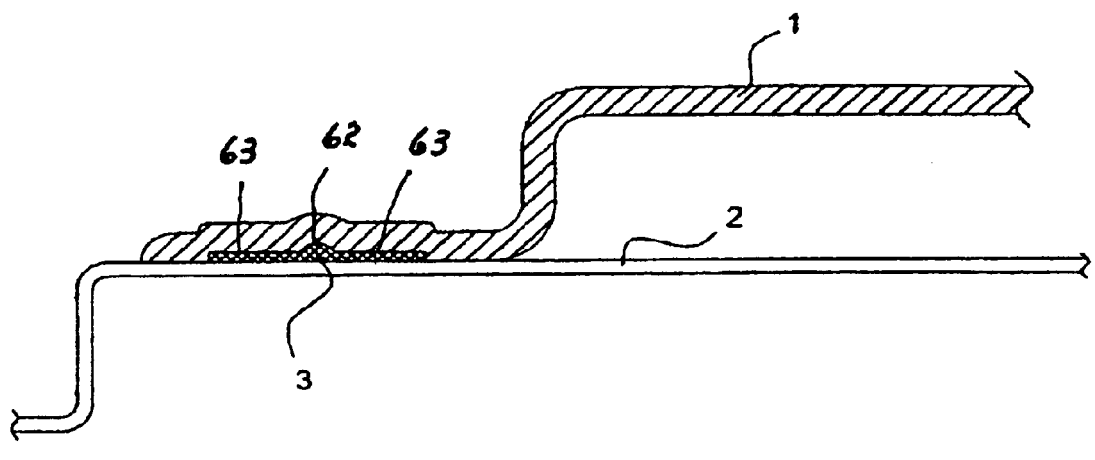
FIG. 8 shows a plan view through section line B B of FIG. 5 showing the trim panel and water barrier mounted together by the permanently tacky adhesive bead.

Turning now to FIGS. 6, 7, and 8 there is shown in FIG. 6 a partial end section exploded view of the trim panel 1 outer periphery having an adhesive bead channel 62 and an adhesive expansion recess 63 and permanent adhesive bead 3. FIG. 7 shows a partial end section exploded view of the trim panel 1 outer periphery with permanent adhesive bead 3 mounted in bead channel 62 thereon and water barrier 2 aligned for mounting on trim panel 1. Finally FIG. 8 shows a partial end section view of water barrier 2 permanently mounted to trim panel 1 by permanent adhesive bead 3, occupying bead channel 62, and expansion recess 63.

Suitable materials for use as a water impervious barrier are well known in the art. Presently preferred materials include polypropylene and polyethylene. Furthermore the water barrier and the access opening cover may comprise the same material or may be comprised of different materials. Additionally, the water barrier may be composed of substantially flexible polymer material.

Suitable permanent adhesives for use in sealing a water barrier to a door panel or door trim panel are well known in the art and need no further clarification here.

Similarly, suitable permanently tacky re-sealable adhesives are also well known in the art.

Trim panel materials for producing preformed trim panels for mounting to door panels are well known in the art.

Although the preferred embodiments of the present invention has been disclosed, various changes and modifications may be made without departing from the scope of the invention as set forth in the appended claims.

What is claimed is:

1. A water barrier and trim panel module for mounting on a vehicle door comprising:
    forming a water barrier of a sheet of water impervious material, with the sheet having an inner and outer face, to a size and shape, and having openings for connecting door components there through, to fit onto the door mating face of a trim panel; an access opening; and an access opening cover having a welded hinge along one edge for assembling the door components through the water barrier and the trim panel;
    providing a pressure sensitive permanent adhesive bead around the periphery of the water barrier inward of openings corresponding to mechanical fastener attachment means locations on the inner face of the water barrier;
    providing a pressure sensitive permanent adhesive bead around the periphery of the openings for passage of the door components and door component connecting means through the water barrier;
    providing a permanently tacky pressure sensitive adhesive bead around the non-welded hinge edges of the access opening cover for the sealing and unsealing of said access opening cover for assembly and repair of the door components and component connecting means; and
    pressing the water barrier against the door mating face of the trim panel to engage the adhesive material on the water barrier periphery forming a water barrier and trim panel module for mounting on the door panel.

2. The water barrier and trim panel module for mounting on a vehicle door as claimed in claim 1 wherein, said water barrier is formed of polypropylene.

3. The water barrier and trim panel module for mounting on a vehicle door as claimed in claim 1 wherein, said water barrier is formed of a substantially flexible water impervious polymer.

4. The water barrier and trim panel module for mounting on a vehicle door as claimed in claim 1 wherein, said water barrier is formed of a substantially semi-rigid water impervious polymer.

5. The water barrier and trim panel module for mounting on a vehicle door as claimed in claim 1 wherein, said access opening cover is formed of the same material as said water barrier.

6. The water barrier and trim panel module for mounting on a vehicle door as claimed in claim 1 wherein, said access opening cover is formed of material different than that of the water barrier.

7. The water barrier and trim panel module for mounting on a vehicle door as claimed in claim 1 wherein, a permanently tacky pressure sensitive adhesive bead is located around the periphery of the access opening.

8. A water barrier and trim panel module for mounting on a vehicle door comprising:
    forming a water barrier of a sheet of water impervious material, with the sheet having an inner and outer face, to a size and shape, and having openings for connecting door components there through, to fit onto the door mating face of a trim panel; an access opening; and an access opening cover having a welded hinge along one edge for assembling the door components through the water barrier and the trim panel;
    providing a pressure sensitive permanent adhesive bead around the periphery of the openings for passage of the door components and door component connecting means through the water barrier;
    providing a permanently tacky pressure sensitive adhesive bead around the non-welded hinge edges of the access opening cover for the sealing and unsealing of said access opening cover for assembly and repair of the door components and component connecting means;
    providing a pressure sensitive permanent adhesive bead within a channel around the periphery of the door mating face of the trim panel inward of openings corresponding to mechanical fastener attachment means locations; and
    pressing the water barrier against the door mating face of the trim panel to engage the adhesive material on the exterior surface of the trim panel forming a water barrier and trim panel module for mounting on the door panel.

9. The water barrier and trim panel module for mounting on a vehicle door as claimed in claim 8 wherein, said door mating face of said trim panel is further characterized as having a permanent adhesive bead expansion recess located on either side of said channel.

10. The water barrier and trim panel module for mounting on a vehicle door as claimed in claim 8 wherein, said water barrier is formed of polypropylene.

11. The water barrier and trim panel module for mounting on a vehicle door as claimed in claim 8 wherein, said access opening cover is formed of the same material as said water barrier.

12. The water barrier and trim panel module for mounting on a vehicle door as claimed in claim 8 wherein, said access opening cover is formed of material different than that of the water barrier.

13. The water barrier and trim panel module for mounting on a vehicle door as claimed in claim 8 wherein, a permanently tacky pressure sensitive adhesive bead is located around the periphery of the access opening.

* * * * *